May 9, 1933.  G. E. NEUBERTH  1,907,858
HOLDING ATTACHMENT
Filed Feb. 4, 1931
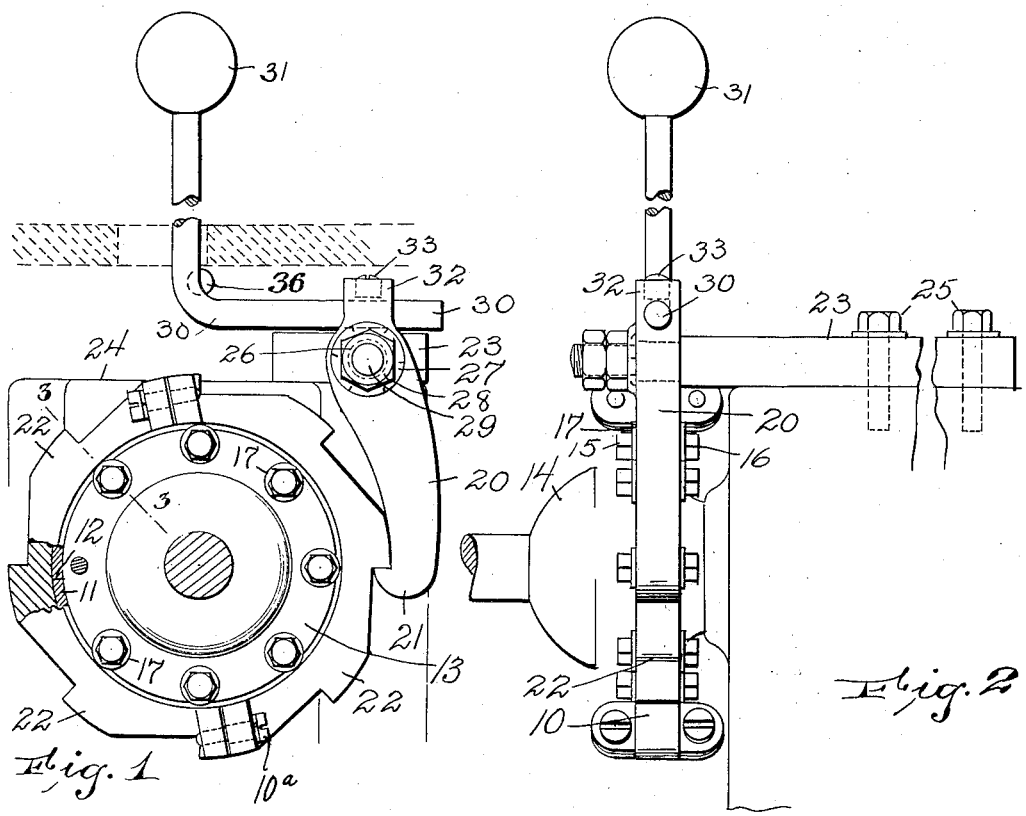
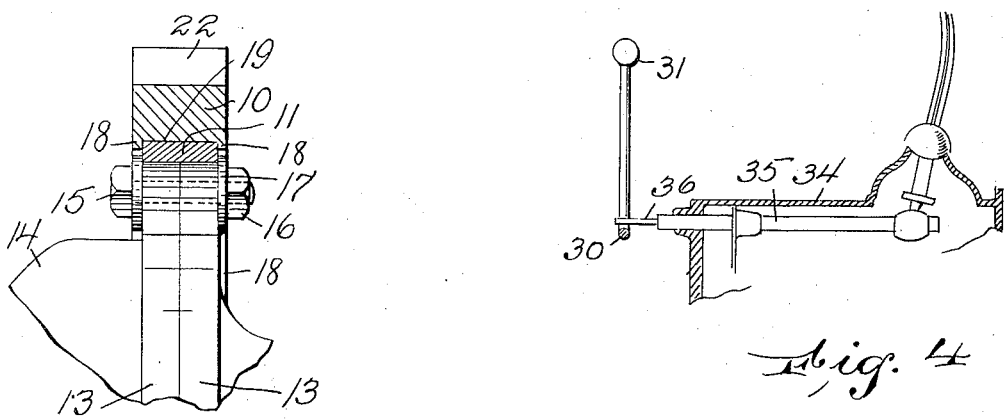
INVENTOR
George E. Neuberth.
BY
Wm H Caufield
ATTORNEY Patented May 9, 1933

1,907,858

UNITED STATES PATENT OFFICE

GEORGE EDWARD NEUBERTH, OF NEWARK, NEW JERSEY

HOLDING ATTACHMENT

Application filed February 4, 1931. Serial No. 513,273.

This invention relates to an improved holding means for preventing the rearward movement of an automobile when it is necessary to stop on an upgrade but which is released automatically on a resumption of forward movement.

When in traffic with frequent stops and starts or when it is necessary to stop for other reasons the car is handled as when on a level surface except that this present device is operated. The car is held against rolling backward and avoids the constant application of the brake. It also overcomes the necessity of alternately operating the clutch and brake so often the custom when awaiting the signal of traffic resumption or the starting of a vehicle in front.

The device is manually operated and automatically released. The manual operation is usually done by means of a lever actuated by moving the leg sidewise. The device may include a lever of a length to extend to nearly the height of the knee of the driver and this location is found to be convenient for easy operation.

The invention is illustrated in the accompanying drawing in which Figure 1 is a rear view of a device embodying my invention. Figure 2 is a side view of the device shown in Figure 1. Figure 3 is a section taken on line 3—3 in Figure 1 on a slightly larger scale. Figure 4 is a small diagrammatic view showing a means for locking the device against operation by a bar in the transmission mechanism.

The device can be installed as an established part of an automobile or it can be attached and the latter form is the one selected for illustration in the drawing. The device is disposed in a position to control the reverse movement of the main shaft or an associated part. I show the device attached directly to the main shaft at the universal joint immediately in rear of the transmission case. This location is easily approached and is convenient for locating an operating lever in easy control of a person in the driver's seat.

The invention comprises a ratchet or the like on the main shaft and a pawl for holding the ratchet against rotation. The pawl is placed in holding position manually and is released by forward rotation of the ratchet.

By forward rotation I mean the rotation of the main shaft when the car is moving forward and is indicated by the arrow in Figure 1.

The ratchet 10 for convenience in installing it is made of two half members secured together by screws 10ª. The screws can be used for adjusting the tension on a ring 11. The ring 11 is inside the ratchet and is preferably of bronze or similar metal. It acts as a cushion or friction connection for the ratchet to prevent the too sudden stopping of the car but is tight enough to function as a single element under normal operation. The ring is split as at 12 to enable it to be placed around the shaft. In the drawing I show the ring around the periphery of the abutting flanges 13 of the universal joint 14. The bolts 15 and nuts 16 that secure the flanges 13 together are provided with washers 17 that extend beyond the edges of the flanges and hold the ring 11 against side movement. The ratchet has side flanges 18 that engage the side faces of the ring 11 and as the ring is seated in the recess 19 between the flanges the parts are held in alignment.

The pawl 20 has a tooth 21 on the end to engage the teeth 22 of the ratchet. The pawl is pivoted to a fixed support and I show a strip 23 secured on the top of the transmission casing 24 by bolts 25. The strip has a stud 26 on which the pawl swings. The spring washer 27 and the nuts 28 on the screw threaded end 29 of the stud 26 are adjusted to hold the pawl against free swinging and to hold it in its adjusted positions against rattling and accidental displacement.

The pawl is operated by a lever 30 which extends under the floor of the car and is usually bent upwardly through a hole in the floor. The usual length of upwardly extending reach is enough to bring the ball 31 about half way between the ankle and the knee of the driver in order to allow the throwing of the lever and pawl without shifting the right foot to any great extent. To allow adjustment laterally the lever 30 is slidable in the extension 32 of the pawl and it is held in its adjusted positions by the screw 33.

The automobile is handled as usual when this device is installed. When riding on an ascending road and it is necessary to stop, the car is handled as usual. When the car has stopped and is about to roll backward and has started to roll backward the lever 30 is pushed over to the right. This causes the pawl 20 to engage the ratchet 10 and the car is held in place. It is not necessary to keep the foot on the brake and the usual backing and starting that drivers find necessary is not required. This has heretofore required use of both feet on clutch pedal and brake. This present device eliminates this and the car stays quietly in place. When it is necessary to start again, the accelerator is pushed down and the car starts up hill without any strain due to backward motion of the car which usually begins between the time the brake is released and the accelerator is operated. When starting with this device the foot is on the accelerator, no movement other than starting is necessary, as the ratchet 10 pushes the pawl 20 away as soon as it starts to rotate.

In Figure 4, I show a small view which illustrates part of the transmission case 34 which includes a rod 35 that is pushed back when the car is placed in reverse gear. I place an extension rod 36 on the rod 35 and this is located so that it passes over the lever 30 at its horizontal part when the lever 30 is in operative position. This insures the retention of the pawl in inoperative position while the car is being driven backward. In any event, the collar 19 provides enough slip to prevent any injury to the mechanism of the car if the pawl is inadvertently left in locking position and the car is started in reverse.

While I have illustrated and described a ratchet and pawl as the holding means, it will be evident that any other clutch releasable in one direction and operable in the reverse direction can be used.

Various changes can be made in the arrangement and proportion of the parts without departing from the scope of the invention.

I claim:

The combination of the universal joint of an automobile, with a ring bearing with friction on the periphery of said joint, a split ratchet adjustable around said ring, a pawl suspended on a pivot alongside said ratchet and adapted to hold said ratchet against movement in one direction, a lever for manually operating the pawl and extending from the pawl to a point directly over said universal joint and a rod to hold the lever in inoperative position and disposed to be engaged by the lever when the car is in reverse.

In testimony whereof he affixes his signature.

GEORGE EDWARD NEUBERTH.